United States Patent [19]
Finch et al.

[11] 3,989,275
[45] Nov. 2, 1976

[54] INTERIOR ENERGY ABSORBING MEANS FOR VEHICLES

[75] Inventors: Peter Molyneux Finch, Oxford; Robert William Goff, Oxon; Christopher John Sykes, Oxford, all of England

[73] Assignee: British Leyland UK Limited, London, England

[22] Filed: June 4, 1975

[21] Appl. No.: 583,833

[30] Foreign Application Priority Data
June 4, 1974 United Kingdom............... 24607/74

[52] U.S. Cl................................ 280/751; 188/1 C; 428/159
[51] Int. Cl.²......................................... B60R 21/04
[58] Field of Search................. 280/150 B; 188/1 C; 296/146, 31 D; 428/159, 160, 163, 167, 218, 315; 180/90

[56] References Cited
UNITED STATES PATENTS

| | | |
|---|---|---|
| 3,493,244 | 2/1970 | Bozich............................ 280/150 B |
| 3,516,675 | 6/1970 | Kuester.............................. 428/218 |
| 3,834,482 | 9/1974 | Wada et al...................... 280/150 B |

*Primary Examiner*—Robert R. Song
*Attorney, Agent, or Firm*—Brisebois & Kruger

[57] ABSTRACT

A Vehicle has energy absorbing means for reducing the severity of occupant injury in an accident comprising a moulding of rigid plastics foam covered with a layer of semi-rigid plastics foam. The rear face of the moulding is formed with a plurality of integral projections which are arranged to collapse, and thereby absorb energy, on occupant impact. The projections may comprise rib-like walls defining a series of discrete cavities, may comprise columns extending to the rear face of the moulding.

2 Claims, 3 Drawing Figures

INTERIOR ENERGY ABSORBING MEANS FOR VEHICLES

This invention relates to vehicles, particularly motor cars, and concerns the provision of energy absorbing means in the interior of vehicles for reducing the severity of injuries to a driver or passenger on impact with the vehicle's interior during an accident.

It is known that resilient padding is sometimes incorporated in the interior trim as a sandwich between the support panel and the finish cover. Generally this is in the form of a thin sheet of soft foam or like material provided solely to give a soft cosmetic effect.

This type of padding is ineffective in an accident situation since the thin layer of foam material "bottoms out" under light loads and is therefore incapable of absorbing a measurable degree of energy.

To reduce injury it is necessary to absorb as much of the occupant's kinetic energy as possible and thereby reduce his impact loads and decelerations to tolerable levels.

Highly resilient foams store energy elastically, absorbing it up to a certain point then releasing it in the opposite direction; this results in undesirable high rebound velocities.

Rigid plastic foams can absorb energy in a satisfactory manner. However under severe impacts, dependent upon the thickness of the padding, the collapsing cells may form a local mass of solid material incapable of further energy absorption.

This invention is designed to overcome these problems and to provide adequate protection to car occupants involved in impact with the interior of the vehicle.

According to the invention a vehicle has energy absorbing means within the passenger compartment comprising a moulding of synthetic plastics rigid foam having a plurality of integral projections extending to the rear face of the moulding, and a layer of force distributing semi-rigid plastics foam covering the front face of the moulding.

The integral projections may comprise rib-like walls defining a series of discrete cavities, or may comprise spaced columns or cones extending towards the rear face of the moulding.

Thus on occupant impact against the energy absorbing means in an accident, the layer of semi-rigid foam spreads the impact load, but energy is mainly absorbed by the collapse of the cellular structure of the moulding adjacent the front face thereof and by the collapse of the rib-like walls or of the spaced columns or cones. Thus the moulding may absorb significantly more energy than a similar moulding having no such projections of any overall thickness.

The moulding may be formed from rigid polyurethane foam; the size and location of the projections will, of course, depend on the application and their suitability can be checked by conventional impact tests.

An embodiment of the invention will now be described with reference to the accompanying drawings in which.

Figure 1:
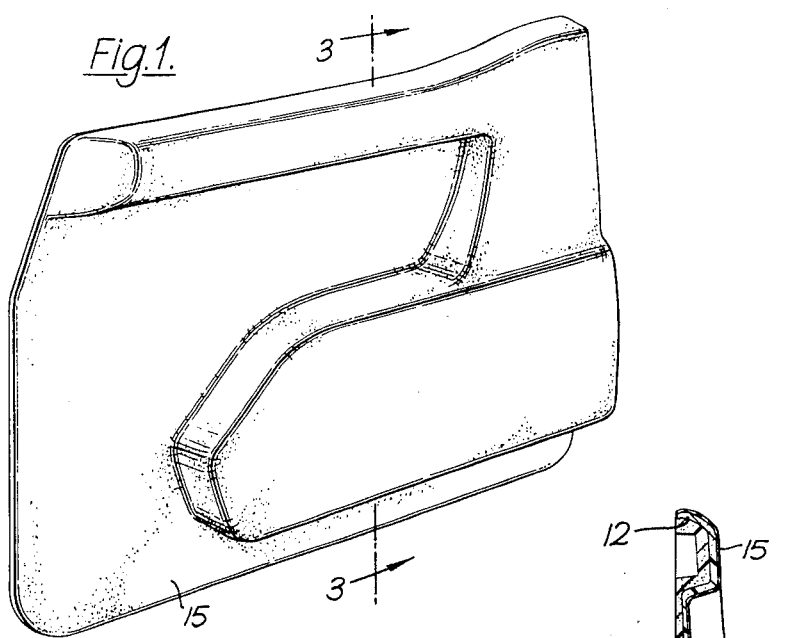
FIG. 1 is a perspective view of the front of a vehicle door trim pad.

The vehicle door trim pad shown in the drawings comprises a moulding of hard rigid polyurethane foam 11. The moulding has a plurality of projections 14 extending to the rear face and forming rib-like walls that define a number of discrete cavities 13 below those areas of the pad which might be hit by a vehicle occupant in an accident.

The moulding 11 is covered on its front face by a layer of force distributing semi-rigid polyurethane foam 12 which is covered by a vacuum formed polyvinyl chloride trim material 15.

Figure 3:
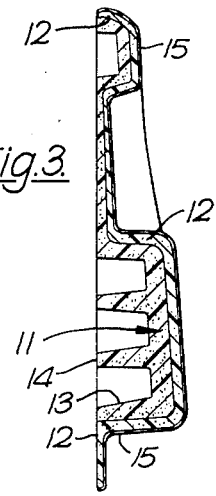
FIG. 3 is a cross-sectional view of the trim pad shown in FIGS. 1 and 2 taken on the line 3—3 in FIG. 1.
Figure 2:
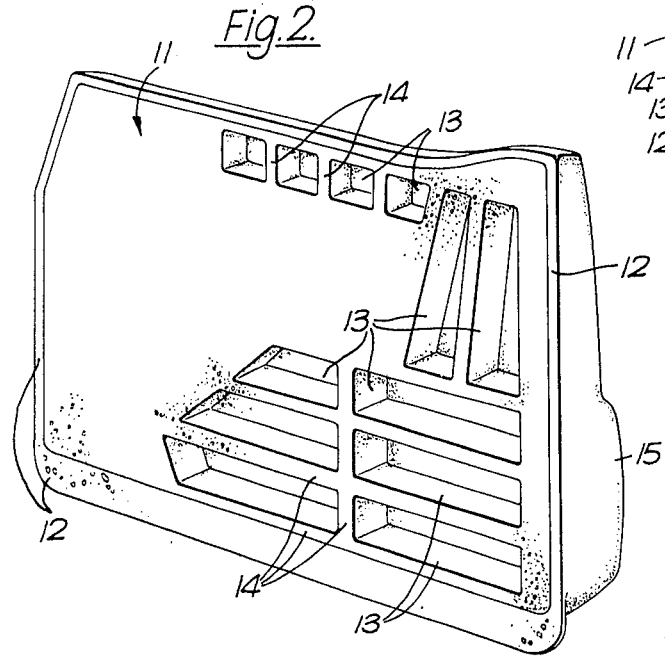
FIG. 2 is a similar view of the rear of the trim pad shown in FIG. 1.

By reference to FIG. 3 it should be appreciated that if those areas of the trim pad overlying the cavities 13 are subject to severe occupant impact, the projecting rib-like walls 14 will collapse thereby dissipating energy and hence reducing the severity of occupant injury.

In an alternative form of the invention somewhat larger cavities are formed in the rear face of the moulding, and integral columns (conveniently in the form of truncated cones) extend from the roof of the cavity to the rear face of the moulding.

We claim:

1. In a vehicle having a passenger compartment at least in part defined by rigid members, the improved energy absorbing means for reducing the severity of injury to a passenger thrown against one of said rigid members which comprises:

a moulding of rigid synthetic plastics foam material overlying said member, said moulding having a rear surface in contact with said member and a front surface facing in the opposite direction, and said moulding defining at least one hollow cavity open at said rear surface and integral projections within said cavity extending from said front surface to said rear surface while leaving substantially all of said cavity not occupied by said projections open at said rear surface, and a layer of less rigid force-distributing foam secured to and covering the front surface of said moulding.

2. The combination claimed in claim 1 in which said projections comprise rib-like walls dividing said at least one cavity into a number of separate cavities, all open at said rear surface.

* * * * *